US012811818B2

(12) United States Patent
Geddes et al.

(10) Patent No.: US 12,811,818 B2
(45) Date of Patent: Nov. 24, 2026

(54) DUAL-QUALITY MEDIA STREAMING AND STORAGE FOR VIDEO CONFERENCING

(71) Applicant: Zoom Communications, Inc., San Jose, CA (US)

(72) Inventors: Graeme Lambourne Geddes, Aliso Viejo, CA (US); Shawn Michael Rolin, San Jose, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 19/093,779

(22) Filed: Mar. 28, 2025

(65) Prior Publication Data

US 2025/0227005 A1 Jul. 10, 2025

Related U.S. Application Data

(63) Continuation of application No. 18/328,321, filed on Jun. 2, 2023, now Pat. No. 12,289,175.

(51) Int. Cl.
*H04L 12/18* (2006.01)

(52) U.S. Cl.
CPC ................................ *H04L 12/1831* (2013.01)

(58) Field of Classification Search
None
See application file for complete search history.

(56) References Cited

U.S. PATENT DOCUMENTS

| | | | |
|---|---|---|---|
| 5,508,733 | A | 4/1996 | Kassatly |
| 6,816,904 | B1 | 11/2004 | Ludwig et al. |
| 7,593,032 | B2 | 9/2009 | Civanlar et al. |
| 7,609,287 | B2 | 10/2009 | Yasutomo et al. |
| 7,733,367 | B2 | 6/2010 | Packer |
| 7,817,180 | B2 | 10/2010 | Jeong et al. |
| 7,864,209 | B2 | 1/2011 | Jeong et al. |
| 7,899,170 | B2 | 3/2011 | Jeong et al. |

(Continued)

FOREIGN PATENT DOCUMENTS

| | | |
|---|---|---|
| CN | 109412886 B | 5/2020 |
| CN | 211791776 U | 10/2020 |

(Continued)

OTHER PUBLICATIONS

What is Simulive and Why is it Great?—YouTube, https://www.youtube.com/watch?v=pRtzBA8cfos, Notified, Oct. 6, 2016, 2 pages.

(Continued)

*Primary Examiner* — Phyllis A Book

(74) *Attorney, Agent, or Firm* — Young Basile Hanlon & 1MacFarlane, P.C.

(57) ABSTRACT

A media file associated with the conference is stored at a user device connected to a conference hosted by a conference server. The media file has a first quality suitable for high-definition playback. During the conference, a media stream having a second quality that is lower than the first quality and adapted for real-time transmission is streamed to the conferencing server. The media file is transferred from the user device to the conferencing server. Streaming the media file may include down-sampling the media file from the first quality to the second quality prior to transmission to the conferencing server.

20 Claims, 12 Drawing Sheets

(56) References Cited

U.S. PATENT DOCUMENTS 7,949,117 B2 5/2011 Jeong et al.
8,289,369 B2 10/2012 Johansen et al.
8,780,166 B2 7/2014 Shanmukhadas et al.
8,988,486 B2 3/2015 Golas
9,445,051 B1 9/2016 Muthsandra Kantharaju et al.
9,705,691 B2 7/2017 Tripathi et al.
9,743,043 B2 8/2017 Avni et al.
10,715,843 B2 7/2020 Van Brandenburg et al.
10,893,080 B2 1/2021 Baram
11,010,810 B1 * 5/2021 Pylant .................... G16H 10/60
11,196,963 B1 12/2021 DiPasquale et al.
11,201,903 B1 * 12/2021 Cabrido .................. H04L 65/65
11,463,656 B1 10/2022 Viswanathan Iyer et al.
11,570,216 B2 1/2023 Vendrow et al.
12,212,888 B2 * 1/2025 Simonen .............. H04N 7/0117
2005/0180341 A1 8/2005 Nelson et al.
2006/0087553 A1 4/2006 Kenoyer et al.
2008/0115185 A1 5/2008 Qiu et al.
2011/0217021 A1 9/2011 Dubin et al.
2012/0082226 A1 4/2012 Weber
2012/0210217 A1 8/2012 Abbas et al.
2012/0274731 A1 11/2012 Shanmukhadas et al.
2014/0267570 A1 9/2014 Weber et al.
2015/0089030 A1 3/2015 Shanmukhadas et al.
2015/0109403 A1 4/2015 Krishnan et al.
2017/0310826 A1 10/2017 Gunasekar et al.
2018/0199075 A1 * 7/2018 Wang ...................... H04L 65/65
2018/0205767 A1 7/2018 Vendrow et al.
2018/0352089 A1 12/2018 Garrido et al.
2019/0124128 A1 4/2019 Bader-Natal et al.
2019/0261046 A1 * 8/2019 Hiremath ............... H04N 21/84
2020/0045091 A1 * 2/2020 Ivov ...................... H04L 65/403
2021/0006606 A1 * 1/2021 Vendrow ............. H04L 12/1818
2021/0135892 A1 5/2021 Ghanaie-Sichanie et al.
2021/0135896 A1 5/2021 Ghanaie-Sichanie et al.
2021/0311910 A1 10/2021 Calveley
2022/0078038 A1 3/2022 Dandapani et al.
2022/0130409 A1 4/2022 Sinclair et al.
2022/0321618 A1 10/2022 Hoeben et al.
2022/0361218 A1 * 11/2022 He ........................ H04L 5/0053
2022/0377407 A1 11/2022 Marchuk et al.
2022/0407899 A1 12/2022 Bouazizi et al.
2023/0140286 A1 5/2023 Fludkov
2023/0198789 A1 6/2023 Springer
2023/0362214 A1 * 11/2023 Bouazizi ............. H04L 65/1104
2024/0022712 A1 * 1/2024 Cohen .................. H04N 19/105
2024/0098307 A1 * 3/2024 Ma ......................... H04N 19/68

FOREIGN PATENT DOCUMENTS

CN 112104833 A 12/2020
CN 212696104 U 3/2021
WO WO-2022212319 A1 * 10/2022 ........... H04L 65/403
WO 2023235519 A1 12/2023

OTHER PUBLICATIONS

Non-linear editing, Wikipedia, https://en.wikipedia.org/wiki/Non-linear_editing, Jun. 2, 2023, 10 pages.
Video Resolution: Key Concepts and Types, TrueConf—https://trueconf.com/blog/wiki/video-resolution#:~:text=1080p%20or%20Full%20HD%20features,%2C%20with%20top%2Dnotch%20playback, Trueconf Team, Jun. 2, 2023, 7 pages.
Ultimate Communication Experience with 4K Video Conferencing, Arvia—https://arvia.tech/the-ultimate-communication-experience-4k-resolution-video-conferencing/, Jun. 2, 2023, 7 pages.
Meeting and Event video Resolutions Explained—i3events, https://i3events.com/meeting-and-event-video-resolutions-explained/, Jan. 5, 2022, 7 pages.
Improving Video Conferencing Quality, IR, https://www.ir.com/guides/video-conferencing-quality, Jun. 2, 2023, 16 pages.
4K Video conferencing: How to Connect Virtual and Global Teams with 4K Video—Lifesize—https://www.lifesize.com/blog/why-4k-video-conferencing/, Staff Writer, Apr. 4, 2019, 11 pages.
International Search Report and Written Opinion mailed on Aug. 29, 2024 in corresponding PCT Application No. PCT/US2024/030996.

* cited by examiner

DUAL-QUALITY MEDIA STREAMING AND STORAGE FOR VIDEO CONFERENCING

CROSS REFERENCE TO RELATED APPLICATIONS

This application is a continuation of U.S. patent application Ser. No. 18/328,321, filed Jun. 2, 2023, the entire disclosure of which is incorporated herein by reference.

FIELD

This disclosure relates generally to conference management and, more specifically, to high-definition (HD) distributed recording of conferences.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

To aid in the understanding this disclosure, an illustrative use case enabled by its implementations is first presented. Assume that recorded video messages from, or a recorded video conversation between, five remote or distributed (e.g., not physically co-located) executives of a company is to be obtained for playback at a company or an industry event. The recording is to be played back on a large (e.g., 100-inch) display, such as during a simulive event or for broadcast. As such, a high quality (e.g., 4K or 3840×2160 pixels resolution) recording is necessary; otherwise, the playback may be too grainy and may look unprofessional. To obtain a high quality recording, the five executives may have to travel to a location where high quality recording equipment or a recording studio is available. However, this is an expensive and an undesirable solution.

In another solution, traditional conference recoding capabilities of a conferencing software, which may be provided by a unified communications as a service (UCaaS) platform deployed at a network- or cloud-based server, may be used to obtain a recording of a conference that includes the executives as conference participants. For example, the five remote executives may join, using respective user devices, a virtual conference (i.e., a conference) enabled by the conferencing software and a recording of the conference can be obtained. Obtaining a recording of the conference includes recording media (e.g., audio, video, or content) streams exchanged between the user devices.

During the conference, the conferencing software facilitates the exchange of the media streams amongst conference participants (i.e., amongst respective devices of the conference participants). To illustrate, when a participant speaks during a conference, a conferencing application (e.g., a client or web application) may transmit the audio stream to the conferencing software, which in turn forwards the audio stream to the other participants (i.e., to the devices of the other participants). Similarly, the conferencing application may stream a video stream associated with a conference participant to the conferencing software, which in turns transmits the video stream to the devices of the other conference participants. A conference participant can experience (e.g., see and/or hear) the media streams exchanged in a conference via a conferencing application available at a device of the conference participant or user interfaces associated therewith.

Figure 4:
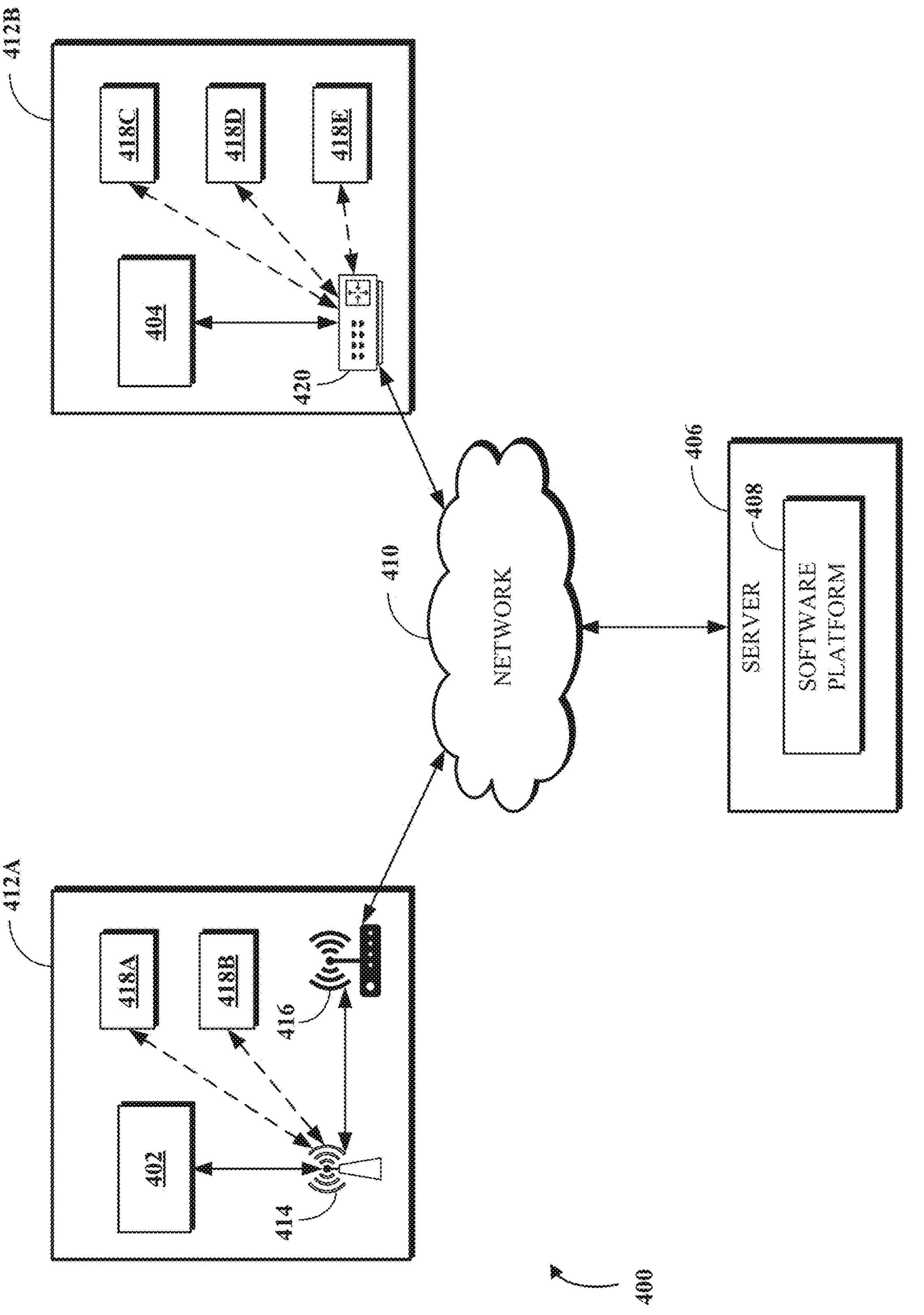
FIG. 4 is an example of an environment in which HD conference recordings can be generated.

However, and as further described with respect to FIG. 4, a recording that includes such exchanged media streams may not have a desired quality. To illustrate, assume that a recording of a conference will be performed at a first device of a first conference participant. As such, a video stream received from a second device of a second conference participant will be included in the recording. A high-definition camera of the second device may capture the conference participant. However, the video stream, as captured by the camera, may not be received in a desirable quality or resolution at the first device. For example, due to insufficient network bandwidth availability at the second device, a high level of compression may be applied to the video stream prior to transmission therewith significantly reducing the video quality. For example, a constraint of the UCaaS may require that the captured video stream be down-sampled to a resolution of 1280×720 pixels (i.e., 720p) prior to transmission to the conferencing software. The conferencing software may further down-sample the video stream to a resolution of 480×360 pixels (i.e., 360p) prior to transmission to the first device. As such, the recording would include the 360p version, which is not of a desired quality or resolution.

Implementations according to this disclosure solve problems such as these by obtaining, at devices connected to a conference, high-quality recordings of only streams originating at those devices. At the termination of the conference, the high-quality recordings are uploaded to the conferencing server. At the conferencing server, the high-quality recordings can be used to obtain composite HD conference recordings.

Figure 1:
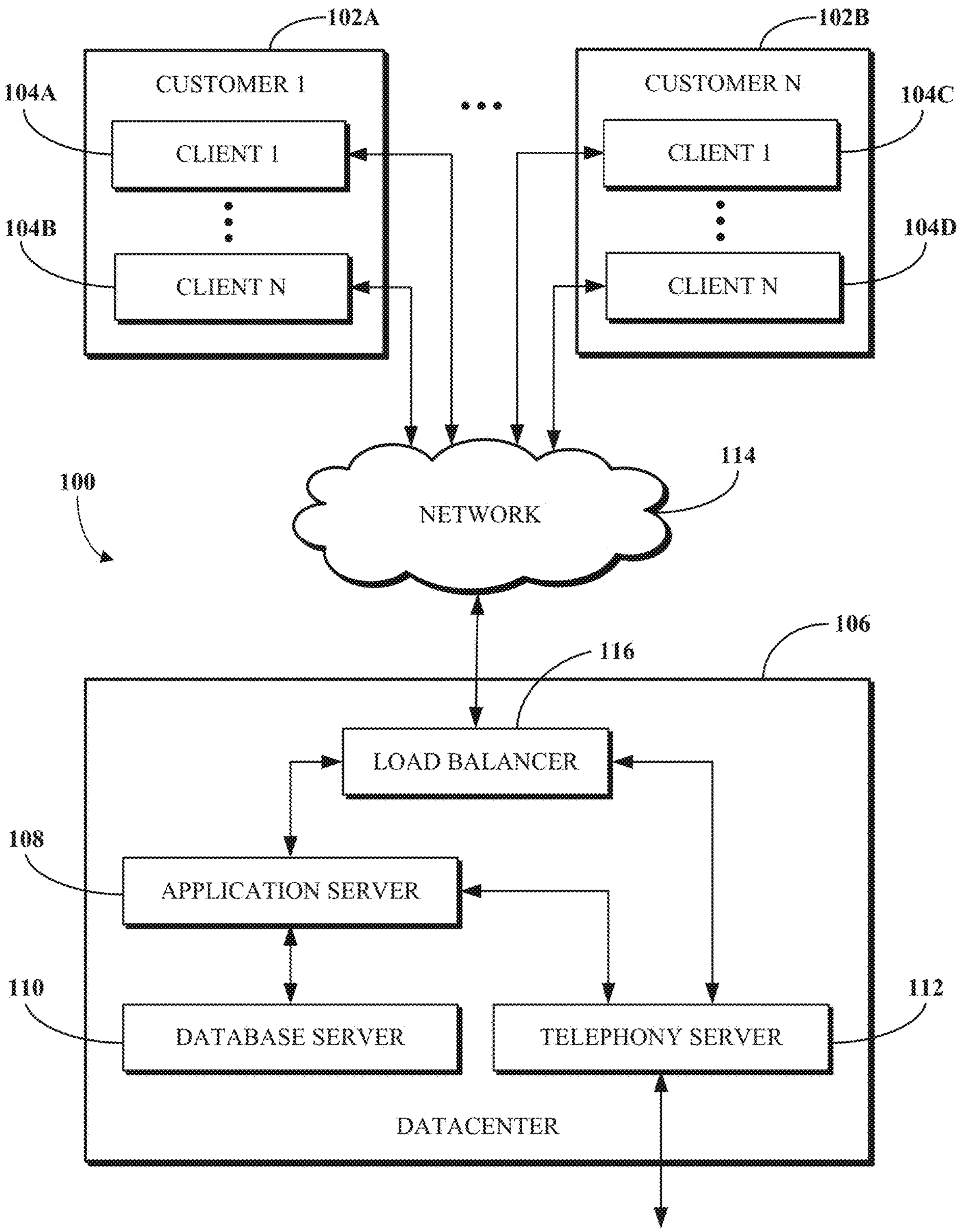
FIG. 1 is a block diagram of an example of an electronic computing and communications system.

To describe some implementations in greater detail, reference is first made to examples of hardware and software structures used to implement a system for obtaining a composite HD conference recording based on distributed recording of a conference. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, one of the clients 104A through 104D or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
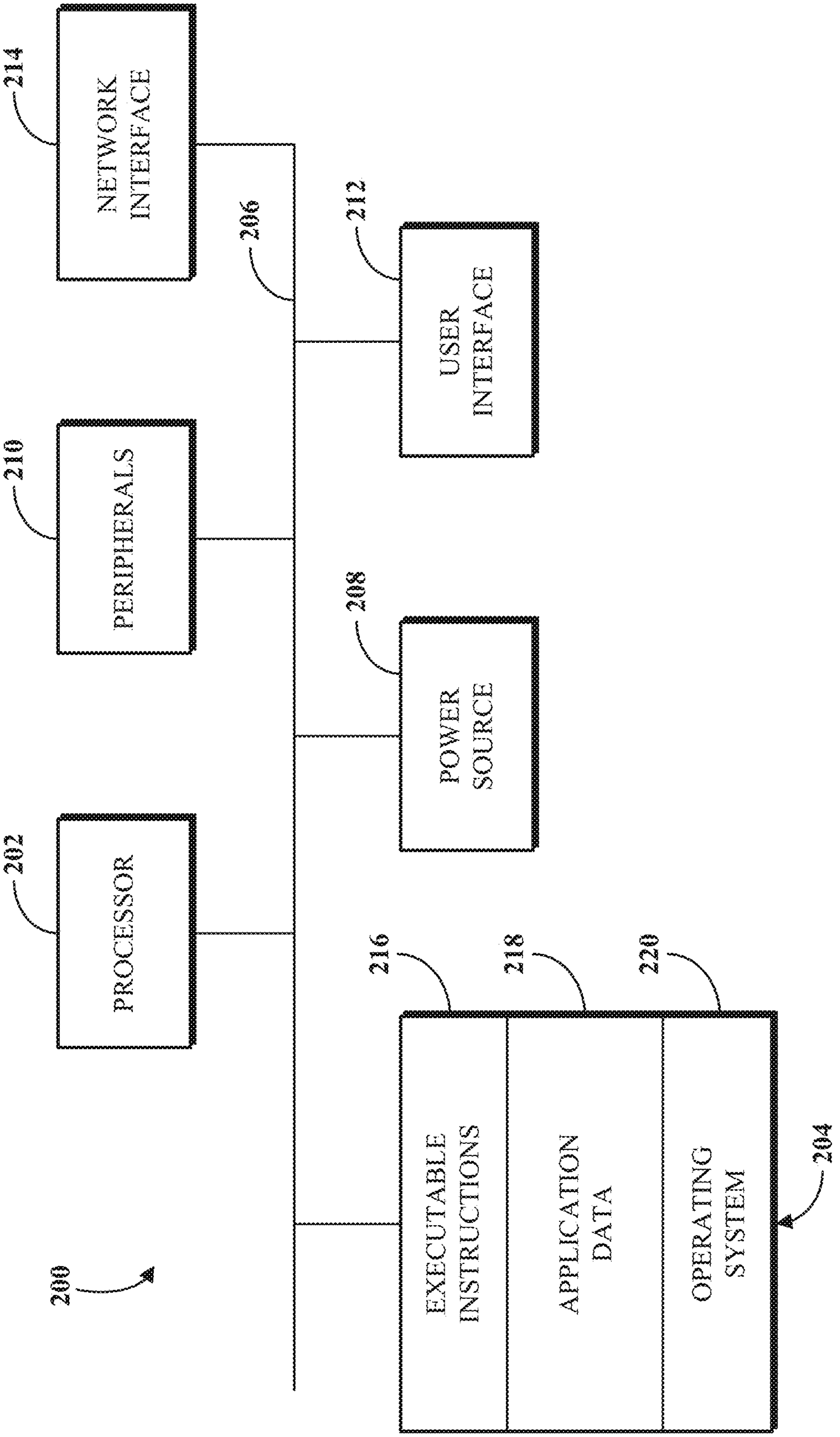
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the clients 104A through 104D, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
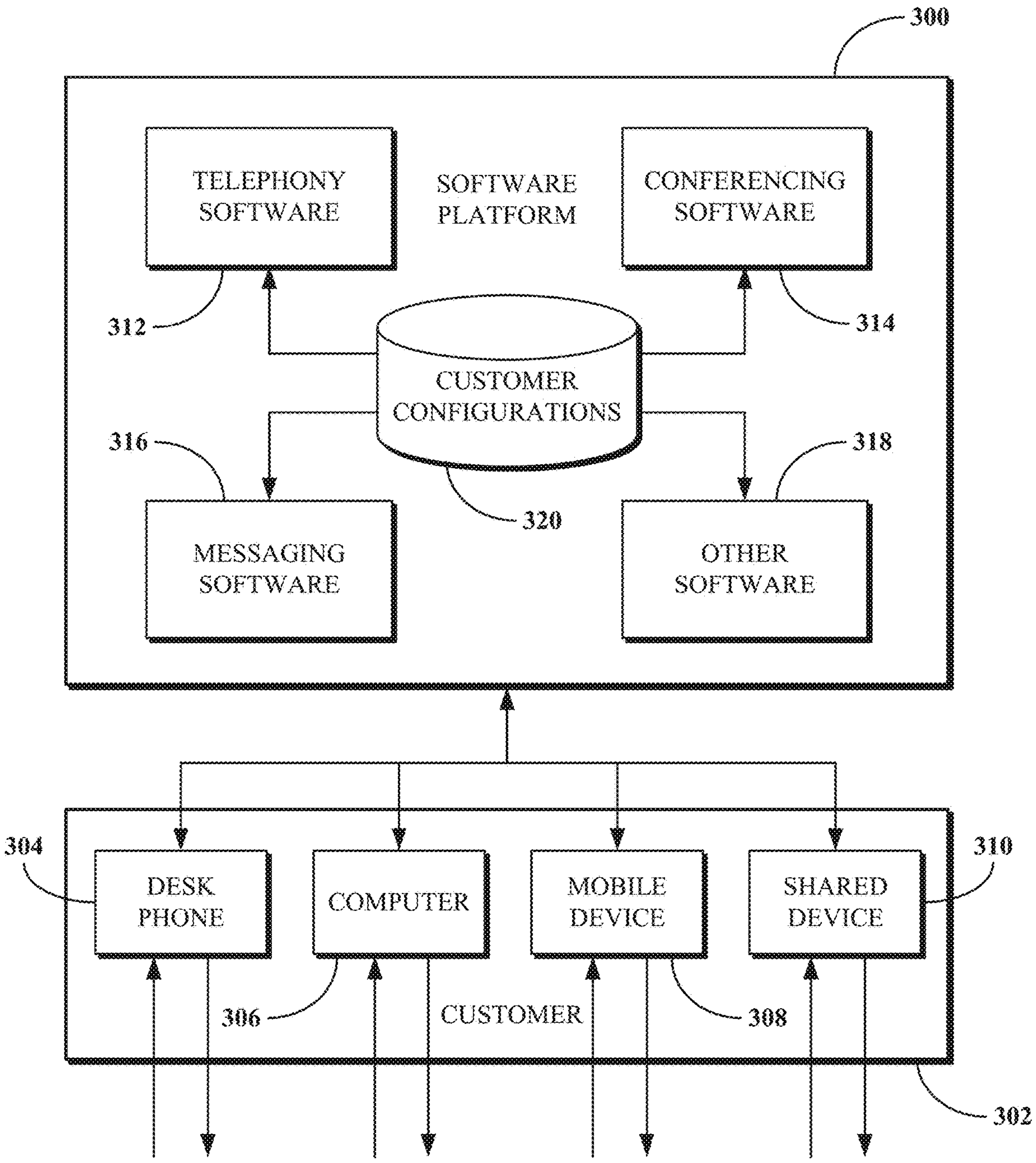
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for generating and/or distributing composite HD conference recordings.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

FIG. 4 is an example of an environment 400 in which HD conference recordings can be generated. The environment 400 is used to illustrate at least some of the reasons that make traditional conference recording capabilities (e.g., features or functions) unusable (e.g., impractical or inappropriate) for obtaining HD conference recordings. However, a person skilled in art would recognize that there can be many additional reasons than those presented herein why it is impractical to obtain HD conference recordings using traditional conference recording techniques. For purposes of this description, it is assumed that it is desirable to obtain an HD conference recording of a conference that includes at least a user device 402 and a user device 404. The HD conference recording is to be obtained at the user device 404.

A server 406, which may be one or more of the servers 108 through 112 of FIG. 1, includes or implements a software platform 408, which may be the software platform 300 of FIG. 3. The software platform 408 provides conferencing services that are accessible, via a network 410, by user devices, such as the user device 402 and the user device 404. Each of the user devices 402 and 404 can be one of the clients 304 through 310 of FIG. 3. The user devices 402 and 404 may be deployed at sites 412A and 412B, respectively. A site can be an office, a home, a home office, a café, or any other physical location at which networking components are accessible by a user device therewith enabling the user device to access and use services of the software platform 408.

At the site 412A, the user device 402 may be connected to a wireless access point 414, which in turn may be connected to a network router 416 that provides access to the network 410. Other devices (e.g., other devices 418A and 418B) may also be deployed at the site 412A and, as such, share the network bandwidth at the site 412A. At the site 412B, the user device 404 may be wired to a router 420. Other devices (e.g., other devices 418C, 418D, and 418E) may also be deployed at the site 412B and, as such, share the network bandwidth at the site 412B. As can be appreciated, many other network configurations are possible at a site and/or many other devices can be deployed at a site.

For an HD conference recording to be generated at the user device 404, then the user device 404 must receive HD and high-quality media streams from other user devices connected to the conference, such as the user device 402. However, it may not be possible to transfer HD media (e.g., video) data from the user device 402 without significant degradation. To illustrate, the Wi-Fi at the site 412A may suffer from poor quality, such as due to interference from other devices, weakened signals, dead spots, or glitchy equipment (e.g., routers). Furthermore, to transmit, for example, 4K video out of the user device 402 may require an upload speed of at least 50 megabits per second (Mbps). However, the upload speed at the site 412A may be limited to 20-25 Mbps. Additionally, lossy compression techniques may be applied to the media streams at the user device 402 prior to transmission over the network 410. The amount of compression applied may depend on network conditions and available bandwidth. Thus, the lossy compression may result in reduced quality.

Additionally, while the network 410 is illustrated in FIG. 4 as one monolithic, cloud-looking object, in reality the network 410 can include a large collection of interconnected devices, such as servers, that communicate with each other through cables and switches. When data packets travel from one device (e.g., the user device 402) to another (e.g., the server 406) via the network 410, the data packets often pass through multiple "hops" or intermediate devices before reaching their destinations. As is known, networks can experience slow data transfer speeds, connectivity issues, hardware failures, software glitches, and congestion caused by high levels of traffic. These problems can lead to data loss. For example, the media data may transmitted using a connectionless protocol, such as the User Datagram Protocol (UDP), which may not provide error checking, flow control, or retransmission of lost packets. As such, some media packets transmitted from the user device 402 may not be received at the server 406 and/or some media packets transmitted from the server 406 may not be received at the user device 404. Any unreceived (e.g., lost) packets could not be included in the conference recoding.

Furthermore, the server 406 may have limited bandwidth. As such, to support hundreds, thousands, or more concurrent conferences and/or tens of thousands of concurrently connected devices, the server 406 (or the software platform 408 therein) may impose a constraint that any video streams received from user devices be limited to 1280×720 pixels (i.e., 720p) and/or any video streams transmitted to user devices are limited to 480×360 pixels (i.e., 360p). As such, down-sampling of the video streams may be performed at the server 406. As such, the user device 404 would not receive HD media streams.

Figure 5:
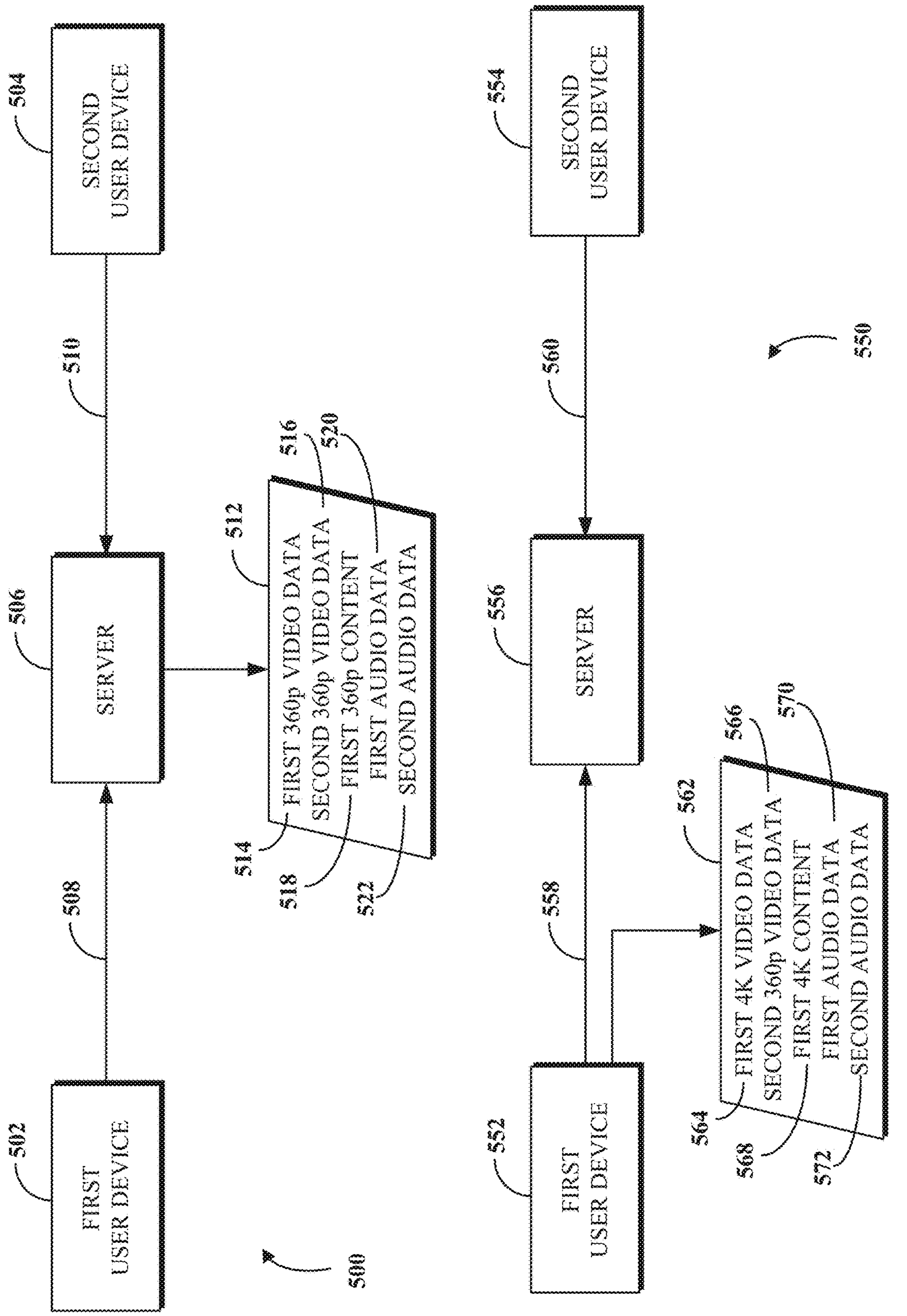
FIG. 5 illustrates obtaining conference recordings using traditional conference recordings techniques.

FIG. 5 illustrates obtaining conference recordings using traditional conference recordings techniques. FIG. 5 includes a first scenario 500 and a second scenario 550 that illustrate recording a conference at a server and at a user device, respectively.

The first scenario 500 illustrates that user devices, including a first user device 502 and a second user device 504 are connected to a conference that is hosted or enabled by a conferencing software (not shown) implemented at a server 506. A configuration (e.g., setting) of the conference may direct the conferencing software to obtain a recording of the conference at the server 506. That is, the conferencing software of the server 506 generates the recording.

As mentioned above, during a conference, media streams are transmitted between user devices, as illustrated by arrows 508 and 510. The media streams may include one or more of video streams, audio streams, and content streams. For example, if a conference participant enables a camera of their user device for use by a conferencing application at the user device, then a video stream of the conference participant may be transmitted from the user device to the other user devices. An audio stream may include any audio played at or captured at (such as by a microphone) the user device. A content stream from a user device may include content shared by a conference participant using the user device. The content stream may include data output (e.g., displayed) at a user device (such as at an output interface) and shared in the conference. The content stream can include, for example, a document or a presentation that is displayed at a display of the user device and/or can include all the data that are displayed on the display.

As media streams are received from the user devices 502 and 504, the server may record these streams to a conference recording 512. The recording captures (e.g., embodies or includes) how these media stream are presented at one or both of the user devices 502 or 504. The conference recording 512 is illustratively shown as including first video data 514, which may be received from the first user device 502 at a resolution of 360p; second video data 516, which may be received from the second user device 504 at a resolution of 360p; first content data 518, which may be received from the first user device 502 at a resolution of 360p and represents screen content shared at the first user device 502; first audio data 520, which may be received from the first user device 502; and second audio data 522, which may be received from the second user device 504.

The conference recording 512 may be or include separate files or recordings. For example, the first video data 514 and the second video data 516 may be stored in one file; the first content data 518 may be stored in a second file; and the first audio data 520 and the second audio data 522 may be stored in a third file. In an example, the conference recording 512 may also include a fourth file that includes both the audio data (e.g., first audio data 520 and the second audio data 522) and the video data (e.g., first video data 514 and the second video data 516).

The second scenario 550 illustrates that user devices, including a first user device 552 and a second user device 554 are connected to a conference that is hosted or enabled by a conferencing software (not shown) implemented at a server 556. A configuration (e.g., setting) of the conference may direct the conferencing software to obtain a recording of the conference at the first user device 552. That is, a conferencing application (not shown) of the first user device 552 is directed to generate the recording.

During a conference, media streams are transmitted between devices, as illustrated by arrows 558 and 560. The media streams may include one or more of video streams, audio streams, and content streams. The first user device 552 may be equipped with a 4K camera. As such, the conferencing application of the first user device 552 may first receive video data where each frame may has a resolution of 3840×2160 pixels. As alluded to above, the conferencing application may down-sample these frames prior to transmission to the server 556. However, since the conference recording is to be generated locally at the first user device 552, the 4K video data can themselves be included in a conference recording 562 since those data do not traverse any networks prior to being included in the conference recording.

As such, the conference recording 562 is illustratively shown as including first video data 564, which are at a resolution of 4K (e.g., HD resolution); second video data 566, which may be received from the second user device 554 at a resolution of 360p; first content data 568, which are also at a resolution of 4K (since they need not traverse any networks) and represent screen content shared at the first user device 552; first audio data 570, which are captured at the first user device 552; and second audio data 572, which may be received from the second user device 554.

As can be seen, the conference recordings 512 and 562 are not HD recordings in either the first scenario 500 or the second scenario 550, respectively. Thus, and to reiterate, traditional conference recording techniques are not usable for obtaining HD conference recordings.

Figure 6:
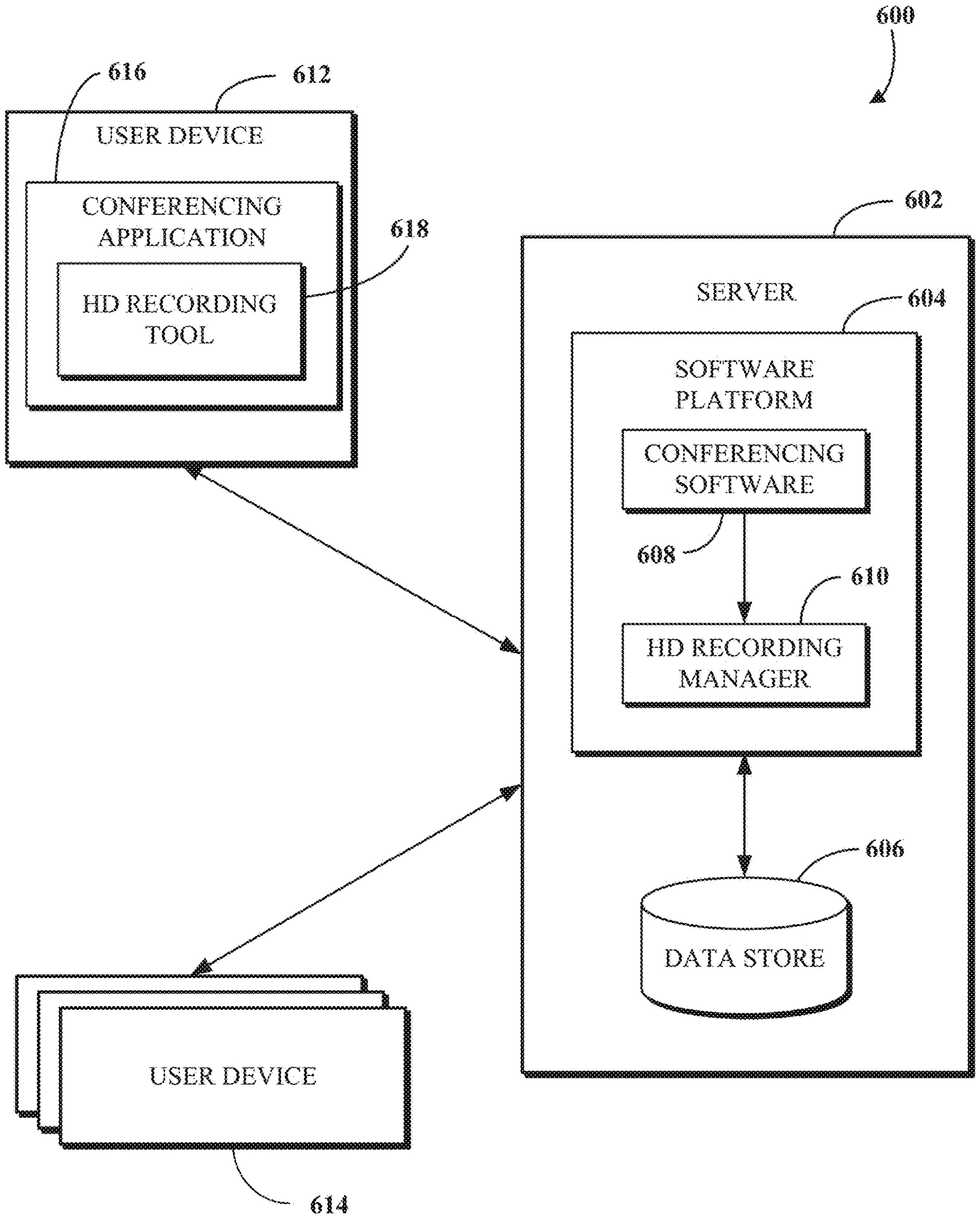
FIG. 6 is a block diagram of an example of a system for obtaining composite HD conference recordings.

FIG. 6 is a block diagram of an example of a system 600 for obtaining composite HD conference recordings. The system 600 includes a server 602 that enables users, inter alia, to participate in (e.g., virtually join) audio-visual conferences, also referred to as conferences. As shown, the server 602 implements or includes some or all of a software platform 604 and a data store 606. The server 602 can be one or more servers implemented by or included in a datacenter, such as the datacenter 106 of FIG. 1. While a single server (i.e., the server 602) is shown, in some cases, multiple servers may be used to implement the software platform 604, for example, by different servers implementing different or redundant functionality or services of the software platform 604.

The software platform 604, via the server 602, provides conferencing services (e.g., capabilities or functionality) via a conferencing software 608. The software platform 604 can be or can be part of the software platform 300 of FIG. 3. The conferencing software 608 can be variously implemented in connection with the software platform 604. In some implementations, the conferencing software 608 can be or can be integrated in the conferencing software 314 of FIG. 3.

The software platform 604 also includes an HD recording manager 610, which may be or may be included in the other software 318 of FIG. 3. In an example, the HD recording manager 610 may be implemented by or included in the conferencing software 608. With respect to a conference, the HD recording manager 610 can receive HD conference recordings from respective devices connected to the conference and store the HD conference recordings in association with the conference.

A composite HD conference recording can be generated based on at least some of the HD conference recordings. In an example, the HD recording manager 610 can be configured (e.g., directed) to automatically generate composite HD conference recording according to a compositing template, as further described herein. In an example, the HD recording manager 610 may be, include, or work in conjunction with a non-linear video editor that can be used to generate customized composite HD conference recordings based on at least some of the HD conference recordings.

A user device 612 and one or more other user devices 614 of respective users are shown as being connected to the server 602. The connections to the server 602 indicate that the user device 612 and the one or more other user devices 614 are connected to a conference. As can be appreciated, many more user devices may simultaneously connect to a conference. Similarly, the software platform 604 can enable many conferences to be concurrently active.

The user device 612 and one or more other user devices 614 can be devices of users who are configured (e.g., enabled) to or otherwise can join a conference. Each of the user device 612 and the one or more other user devices 614 may, for example, be one of the clients 304 through 310 of FIG. 3. Alternatively, the user device 612 or at least one of the one or more other user devices 614 may be a device other than a client. The user device 612 includes a conferencing application 616, which in turn includes an HD recording tool 618. At least some of the one or more other user devices 614 can also include respective conferencing applications (not shown).

The data store 606 can store data related to conferences and data related to users who have participated in or were invitees of conferences, or are invitees of future conferences. The data store 606 can be included in or implemented by a database server, such as the database server 110 of FIG. 1. The data store 606 can include data related to scheduled or ongoing conferences and data related to users of the software platform 604. The data store 606 can be used to store association between HD conference recordings and conferences. The data store can be used to store configurations (e.g., settings, preferences, or editing commands) associated with generated and/or to be generated composite HD conference recordings. The data store 606 can store statuses associated with HD media streams associated with conferences. A status may include whether an upload of an HD conference recording has started, failed, completed, or been retried.

Figure 7A:
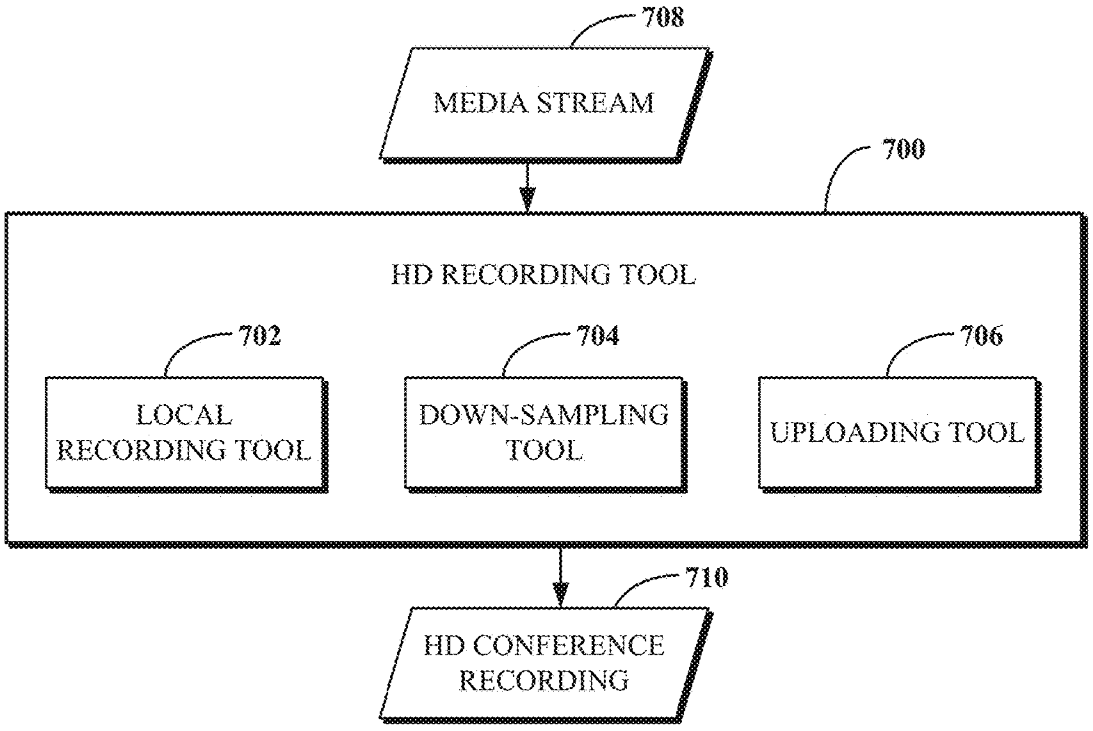
FIG. 7A is a block diagram of example functionality of an HD recording tool.

FIG. 7A is a block diagram of example functionality of an HD recording tool 700, which may be, for example, the HD recording tool 618 FIG. 6. As such, the HD recording tool 700 can be implemented or executed at a user device that is connected to a conference. The HD recording tool 700 includes tools, such as programs, subprograms, functions, routines, subroutines, operations, executable instructions, and/or the like for, inter alia and as further described below, obtaining a recording of a media stream originating at the user device and uploading the recoded media stream to a server.

At least some of the tools of the HD recording tool 700 can be implemented as respective software programs that may be executed by one or more computing devices, such as the computing device 200 of FIG. 2. A software program can include machine-readable instructions that may be stored in a memory such as the memory 204, and that, when executed by a processor, such as processor 202, may cause the computing device to perform the instructions of the software program.

As shown, the HD recording tool 700 includes a local recording tool 702, a down-sampling tool 704, and an uploading tool 706. In some implementations, the HD recording tool 700 can include more or fewer tools. In some implementations, some of the tools may be combined, some of the tools may be split into more tools, or a combination thereof. In some implementations, the HD recording tool 700 may not include the down-sampling tool 704.

The HD recording tool 700 receives a media stream 708 that originates at the user device. The media stream 708 can be or include one or more of video data, audio data, or content data. The video data (e.g., stream) may be captured by an image capture device (e.g., a camera) associated with the user device. The camera can be configured to capture high-resolution video data. The image capture device may be capable of capturing video in resolutions of 1920×1080 pixels (i.e., 1080p), 3840×2160 pixel (i.e., 4K), 7680×4320 pixels (i.e., 8K), or some other resolution. The audio data (e.g., stream) can be captured by an audio capture device (e.g., a microphone) associated with the user device. The content data (e.g., stream) can include at least a portion of content displayed on a display of the user device. The content stream may be captured by a desktop capture tool that captures (e.g., obtains screen shots of) the entire desktop or a portion thereof, such as the displayed content of all open windows and applications or the displayed content associated with one window or application.

The local recording tool 702 can locally save (e.g., store) the media stream 708 to an HD conference recording 710. The local recording tool 702 can save the HD conference recording 710 as application data to a memory, such as the memory 204 of FIG. 2. The local recording tool 702 can save the video data of the conference into the HD conference recording 710 as a video file, can save the audio data of the conference into the HD conference recording 710 as an audio file, and can save the content data of the conference into the HD conference recording 710 as a content video file. In an example, the local recording tool 702 can additionally combine the video data and the audio data into an audio-video file that is also saved to the HD conference recording 710.

The down-sampling tool 704 can down-sample the media stream 708 for transmission to a server, which in turn may transmit the down-sampled stream to other devices connected to the conference. In an example, the down-sampling tool 704 can perform lossy compression on the down-sampled media stream for transmission to the server. In an example, video data and/or content data may be down-sampled to a resolution of 360p or 720p prior to transmission to the server. Accordingly, the media stream transmitted for display at devices of other conference participants can be a derived media stream from an original media stream (e.g., the media stream 708). In an example, the derived media stream may be the media stream itself. For example, an audio stream may be transmitted as is and without down-sampling.

The uploading tool 706 transfers (e.g., uploads) the HD conference recording 710 to the server. Transferring the HD conference recording 710 to the server may include losslessly compressing the HD conference recording 710 prior to the transfer. Any number of techniques, tools, or protocols can be used to transfer the HDD conference recording 710. For example, one of File Transfer Protocol (FTP), Hypertext Transfer Protocol (HTTP), Secure File Transfer Protocol (SFTP), Hyper Text Transfer Protocol Secure (HTTPS), Secure Copy Protocol (SCP), or other protocols may be used. The server receives the HD conference recording 710 and stores it in association with the conference. For example, the server may associate an identifier of the conference with the HD conference recording 710.

The uploading tool 706 may determine that uploading the HD conference recording 710 has been interrupted and resumes the upload when possible. For example, a network outage may interrupt the upload and the upload is resumed when network access is reestablished. For example, a user may pause the upload. As such, the uploading tool 706 resumes the upload in response to receiving a resume command from the user.

Figure 7B:
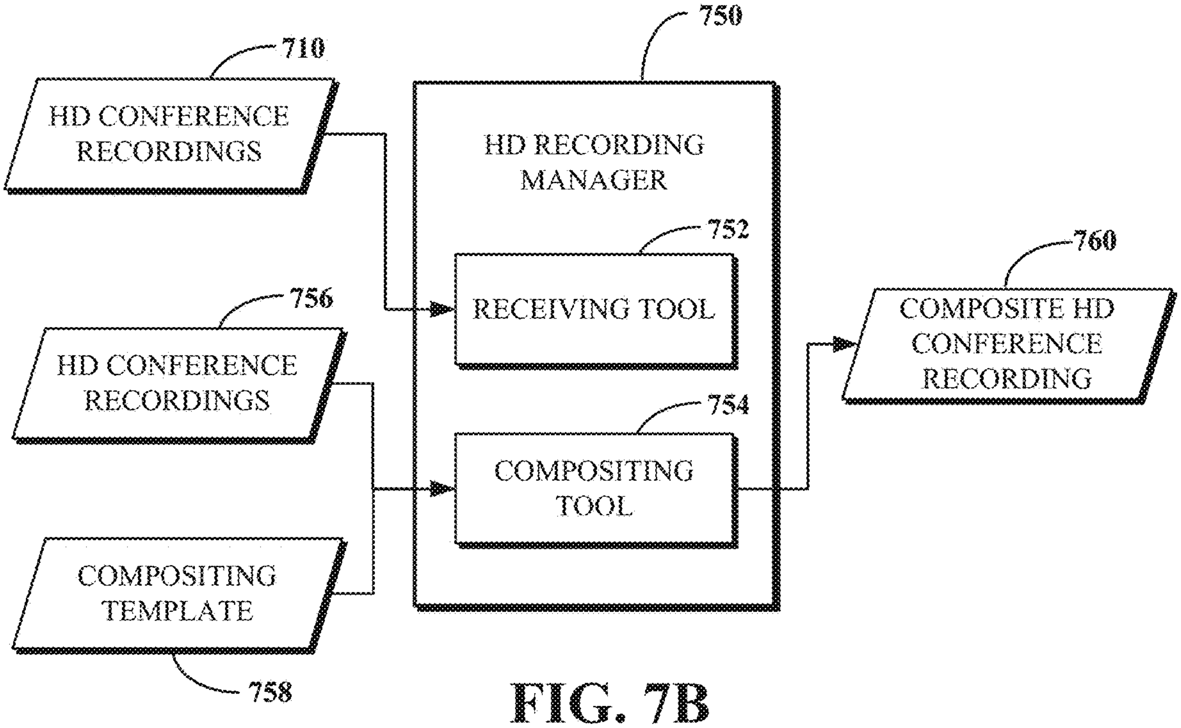
FIG. 7B is a block diagram of example functionality of an HD recording manager.

FIG. 7B is a block diagram of example functionality of an HD recording manager 750, which may be, for example, the HD recording manager 610 of FIG. 6. As such, the HD recording manager 750 can be implemented or executed at a server and may be included in or work in conjunction with a conferencing software. The HD recording manager 750 includes tools, such as programs, subprograms, functions, routines, subroutines, operations, executable instructions, and/or the like for, inter alia and as further described below, receiving HD conference recordings and generating composite HD conference recordings.

At least some of the tools of the HD recording manager 750 can be implemented as respective software programs that may be executed by one or more computing devices, such as the computing device 200 of FIG. 2. A software program can include machine-readable instructions that may be stored in a memory such as the memory 204, and that, when executed by a processor, such as processor 202, may cause the computing device to perform the instructions of the software program.

As shown, the HD recording manager 750 includes a receiving tool 752 and a compositing tool 754. In some implementations, the HD recording manager 750 can include more or fewer tools. In some implementations, some of the tools may be combined, some of the tools may be split into more tools, or a combination thereof.

The receiving tool 752 can receive HD conference recordings from user devices connected to a conference. For example, the receiving tool 752 is shown as receiving the HD conference recording 710 of FIG. 7A. The receiving tool 752 may identify (e.g., receive identifications of) conference participants from whom (i.e., from devices of whom) HD conference recordings are to be received. The receiving tool 752 may keep track in a data store, such as the data store 606 of FIG. 6, of statuses of uploads of HD conference recordings.

The compositing tool 754 may display or cause to be displayed user interfaces that enable a user to generate composite HD conference recordings. Such a user interface is illustrated with respect to FIG. 9. The compositing tool 754 can generate a composite HD conference recording 760 based on one or more HD conference recordings 756 and a compositing template 758.

The HD recording manager 750 can then store the composite HD conference recording 760 in association with the conference. The composite HD conference recording 760 may be downloaded or may be streamed for playback. In an example, streaming the composite HD conference recording 760 can include streaming an encoded version of the composite HD conference recording 760. In an example, a transcoder may be used to generate different versions of the composite HD conference recording 760 for playback on different types of devices and to satisfy different resolution and bandwidth requirements.

Figure 8:
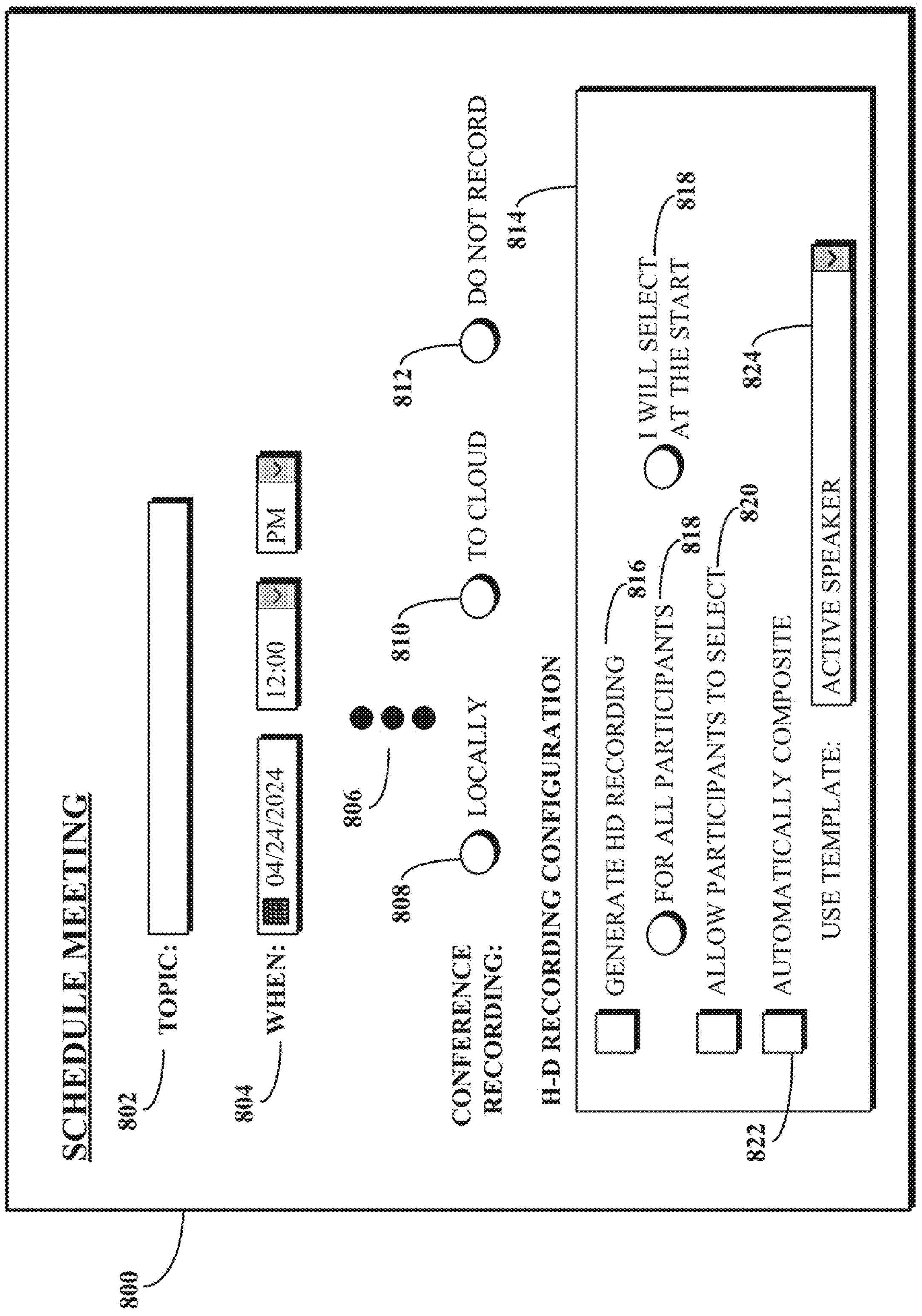
FIG. 8 is an example of a user interface for scheduling conferences.

FIG. 8 is an example of a user interface 800 for scheduling conferences. The user interface 800 may be generated or displayed by a conferencing software, such as the conferencing software 608 of FIG. 6. While certain fields and arrangements of fields are illustrated in the user interface 800, the disclosure herein is not so limited and other fields and arrangements therefor are possible.

The user interface 800 can be used to schedule a future conference or to start a conference. Via the user interface 800 a user can provide settings or configurations for the conference. For example, a field 802 can be used to provide a topic, a subject, or any data descriptive of the conference; and a field 804 can be used to set a starting time for the conference. Other settings or configurations can also be provided, as indicated by an ellipsis 806. For example, the user may be able to identify invitees or attendees of the conference, may be able to set or obtain connection information to conference, and so on.

The user can indicate whether a traditional recording of the conference is to be generated. If the user selects a field 808, then the recording can be generated as described with respect to the second scenario 550 of FIG. 5. If the user selects a field 810, then the recording can be generated as described with respect to the first scenario 500 of FIG. 5. If the user selects a field 812, then the conference will not be recorded.

A sub-section 814 enables the user to select options related to generating a composite HD conference recording of the conference. By selecting a field 816, the user indicates that HD conference recordings are to be generated. By selecting an option 818, HD conference recordings are obtained for every one of the conference participants that joins the conference. That is, HD recording tools of the respective devices of the conference participants generate the HD conference recordings, as described with respect to the HD recording tool 700 of FIG. 7A. If the user selects an option 818, then the user will be able to select, while the conference is ongoing, conference participants for whom to stop or start generating HD conference recordings. Generating an HD conference recording for a conference participant can include directing (e.g., transmitting a request to) an HD recording tool available at the user device of the conference participant to generate the HD conference recording.

If the user selects an option 820, then any conference participant can cause an HD conference recording to be generated at their device (i.e., by a HD recording tool 700 available at their device). Additionally, the conference participant is able to stop, start, pause, or restart an HD conference recording.

By selecting an option 822, the user directs an HD recoding manager, such as the HD recording manager 610 of FIG. 6, to automatically generate a composite HD conference recording from the uploaded HD conference recordings of the conference. That is, after the individual HD conference recordings are received at the server, the HD recoding manager can composite the individual HD recordings into a composite HD conference recording according to a compositing template that the user can select via a user interface control 824. Compositing options are further illustrated with respect to FIG. 9.

Figure 9:
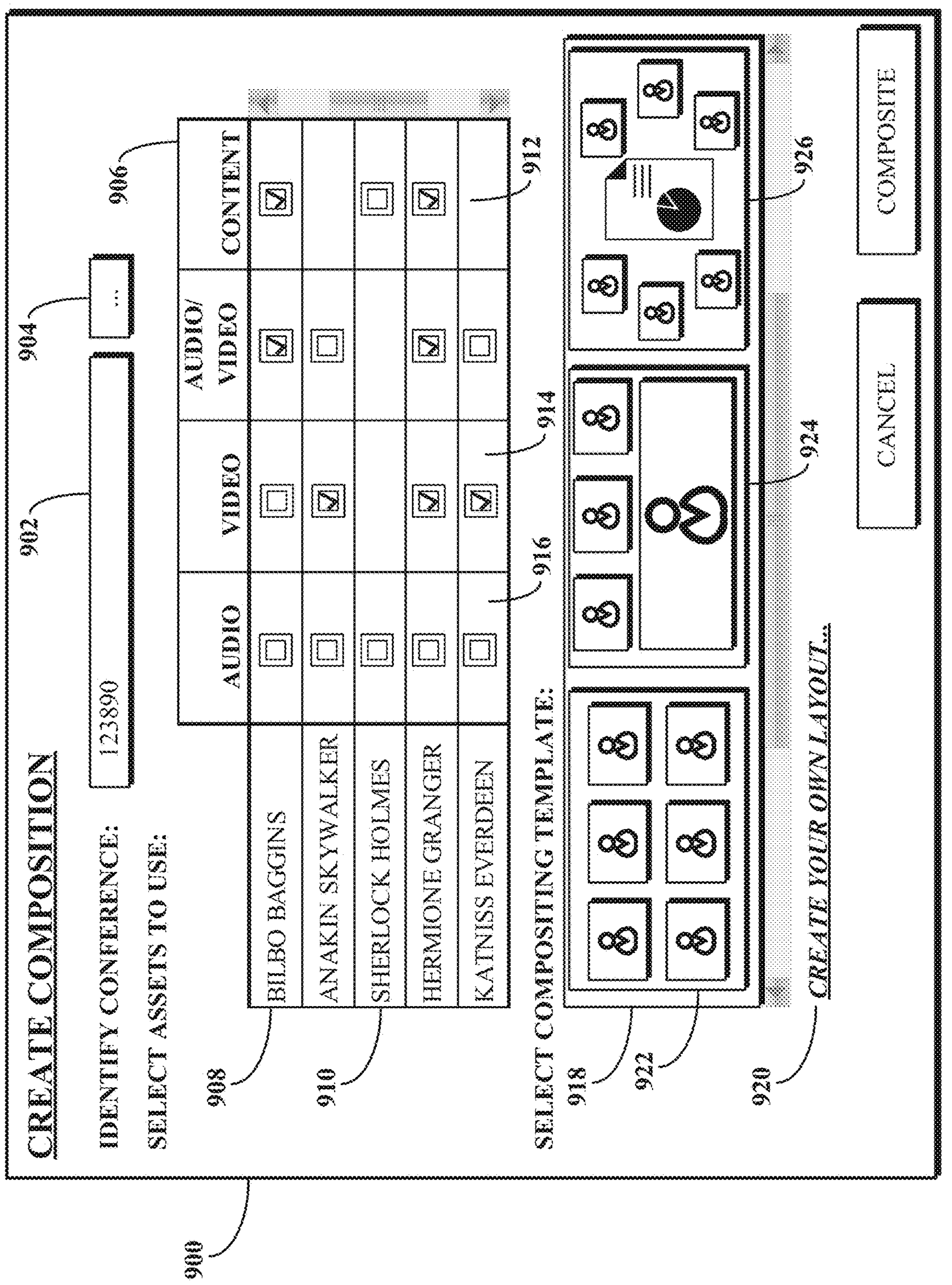
FIG. 9 is an example of a user interface that can be used for generating composite HD conference recordings.

FIG. 9 is an example of a user interface 900 that can be used for generating composite HD conference recordings. The user interface 900 may be generated or displayed by an HD recording manager, such as the HD recording manager 750 of FIG. 5. While certain fields and arrangements of fields are illustrated in the user interface 900, the disclosure herein is not so limited and other fields and arrangements therefor are possible. The user interface 800 enables a user to select one or more HDD conference recordings associated with a conference and to cause a composite HD conference recording to be generated based on the selected HD conference recordings and according to a compositing template.

A field 902 can be used to enter data identifying a conference. A control 904, when invoked, causes a search user interface (not shown) to be presented and that enables the user to provide different criteria for identifying conferences. The data entered in the field 902 and/or the search criteria can result in the identification of one or more conferences. As such, it is possible to create a composite HD conference recording that uses HD conference recordings associated with more than one conference.

In response to identifying a conference, a table 906 is populated such that each row is associated with a conference participant of the conference and from whose device an HD conference recording was received. If a cell at the intersection of a row and a column in the table 906 includes a checkbox, then the corresponding media stream was received from the device of that conference participant. To illustrate, a row 908 indicates that an audio stream, an HD video stream, an HD audio-video stream, and an HD content stream were received from a device associated with the conference participant named "BILBO BAGGINS;" and a row 910 indicates that only an audio stream and an HD content stream were received from a device associated with the conference participant named "SHERLOCK HOLMES." A cell 912, since no checkbox is included therein, illustrates that a content stream was not received from the device associated with the conference participant named "KATNISS EVERDEEN."

The user can select (e.g., check desired checkboxes of) the streams to be included in the composite HD conference recording. A cell 914 illustrates that the HD video stream received from the device of the conference participant named "KATNISS EVERDEEN" is to be included in the composite HD conference recording. As such, since the checkbox in a cell 916 is not checked but the checkbox in the cell 914 is checked, then the composite HD conference recording will include the video stream but not the audio stream associated with the corresponding conference participant.

A compositing template can be selected from a compositing template gallery 918 or by selecting an option 920, which, when invoked, causes other user interfaces (not shown) to be displayed enabling the user to create (e.g., configure) a compositing template. Via the option 920, the user may configure different compositing template layouts, such as by configuring a number of rows and columns of tiles (e.g., 2×2, 3×3, or 4×2), a large speaker tile surrounded a number (e.g., 6 or 9) of smaller participant tiles, and the like. A tile (e.g., a square) can be a portion of a frame of an composite HD conference recording associated with a conference participant. For example, an HD video recording obtained from the device of the conference participant can be displayed in the tile.

A compositing template is used by the HD recording manager to determine how representations of the selected conference participants are laid out in the composite HD conference recording. The compositing template gallery 918 is shown as including three compositing template. However, more, fewer, or other compositing templates with different arrangements of audio, video, and content streams are possible, such as the compositing template illustrated with respect to FIG. 10. Compositing templates 922, 924, and 926 may be referred to a "gallery template," an "active speaker template," and a "presentation template," respectively.

The gallery template, when selected, causes the HD recording manager, or a compositing tool therein, to arrange the selected HD video streams in a grid pattern such that each of the selected video streams is displayed in a corresponding tile. Any selected audio streams are also composited into the composite HD conference recording and synchronized with the corresponding video streams. Additionally, any selected content streams associated a conference participant may be displayed in the tile of the conference participant or in separate tile.

The active speaker template, when selected, results in a large tile (e.g., a "speaker tile") showing the video stream of a conference participant who is speaking and the video streams of the other selected conference participants to be arranged in a row of smaller tiles above the large tile. As such, the composing tool uses the audio streams to determine which video stream to display, and the timing thereof, in the speaker tile.

The presentation template, when selected, results in a large central tile (e.g., a "content tile") that displays HD content streams and the selected conference participants (i.e., HD video streams associated therewith) to be arranged around the large central tile.

Other rules (e.g., configurations) may be associated with compositing templates. A rule may relate to the handling of speaking conference participants. To illustrate, the HD recording manager may be directed to display the HD media stream of any identified speaking participant into the speaker tile. The rule may set a conference participant priorities so that the HD recording manager can determine which of multiple speaking participants to associate with the speaker tile. The rule may identify whether the HD recording manager is to associated only certain conference participants with the speaker tile.

Figure 10:
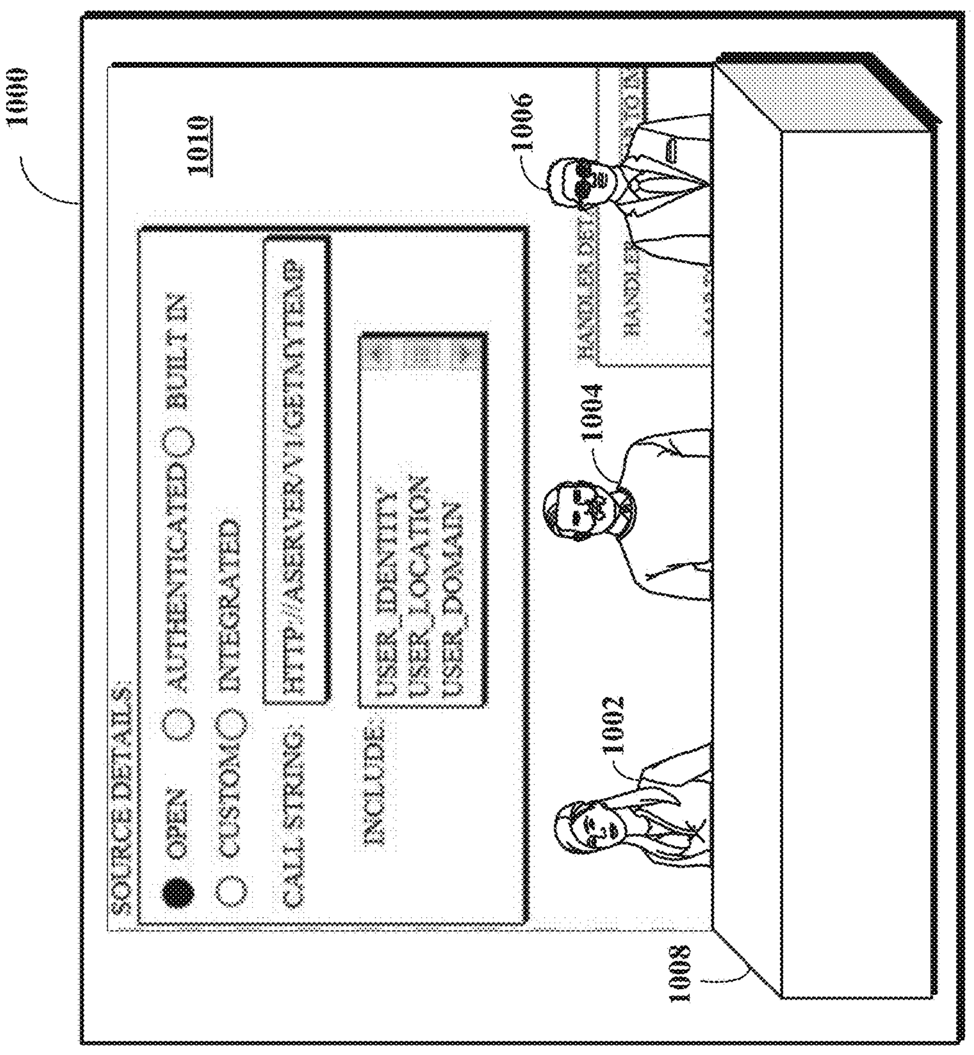
FIG. 10 is an example of a frame of a composite HD conference recording.

FIG. 10 is an example of a frame 1000 of a composite HD conference recording. The composite HD conference recording may be generated by an HD recording manager, such as the HD recording manager 750 of FIG. 7B. The composite HD conference recording may be generated according to a compositing template that may be referred to as a "panel template." According to the panel template, the video streams of selected conference participants (in this case, conference participants 1002, 1004, and 1006) are shown as if the conference participants were sitting behind a desk 1008. Selected content streams are shown as a background 1010 of the composite HD conference recording. That is, any HD content streams are displayed as the background of the composite HD conference recording and the HD video streams of the conference participants are overlayed on top of the background.

To further describe some implementations in greater detail, reference is next made to examples of techniques which may be performed for obtaining composite HD conference recordings based on distributed recording of conferences.

Figure 11:
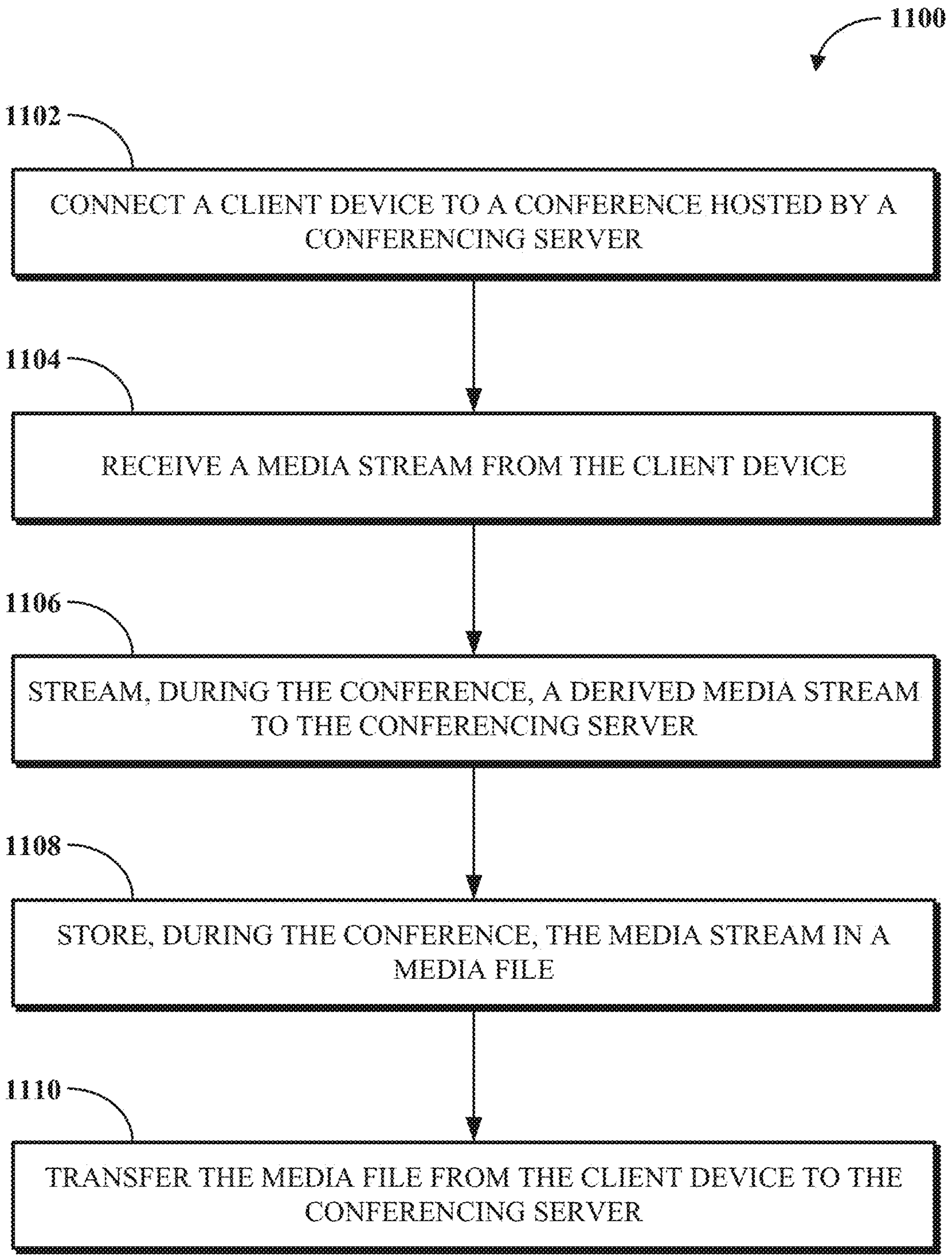
FIG. 11 is a flowchart of an example of a technique for obtaining HD media streams at user devices.

FIG. 11 is a flowchart of an example of a technique 1100 for obtaining HD media streams at user devices. The technique 1100 can be executed using computing devices, such as the systems, hardware, and software described with respect to FIGS. 1-10. The technique 1100 can be executed at a user device, such as the user device 612 of FIG. 6. The technique 1100 can be executed or implemented at least in part by an HD recording tool, such as the HD recording tool 618 of FIG. 6 or the HD recording tool 700 of FIG. 7A. The technique 1100 can be performed, for example, by executing a machine-readable program or other computer-executable instructions, such as routines, instructions, programs, or other code. The steps, or operations, of the technique 1100 or another technique, method, process, or algorithm described in connection with the implementations disclosed herein can be implemented directly in hardware, firmware, software executed by hardware, circuitry, or a combination thereof.

For simplicity of explanation, the technique 1100 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1102, the user device is connected to a conference that is hosted by a conferencing server, such as the server 602 of FIG. 6. At 1104, a media stream is received from the user device. The media stream can be as described with respect to the media stream 708 of FIG. 7A. The media stream can include a video stream (e.g., an HD video stream). The media stream can include an audio stream. The media stream can include a content stream that includes data shared to the conference by a user of the user device. The content stream can be saved to a second media file.

At 1106, a derived media stream that is obtained from the media stream is streamed to the conferencing server, which in turn may transmit the derived media stream to devices of other conference participants. In an example, the derived media stream can have a lower resolution than the media stream. To illustrate, the media stream may be a 4K video stream and the derived media stream can be a **360*p*** video stream derived therefrom via any known sub-sampling techniques.

At 1108, as the conference is ongoing, the media stream is incrementally stored, such as to a media file, at a location accessible to the user device. At 1110, the media file is transferred from the user device to the conferencing server. In an example, the media file(s) obtained during the conference and stored to the user device can be transferred from the user device to the conferencing server in response to receiving a request to transfer the media file. In an example, a user of the user device may cause the media file(s) to be transferred. In an example, a command may be received from the conferencing server that causes the HD recording tool to transfer the media file(s). In an example, the HD recording tool may transfer the media file(s) to the conferencing server subsequent to (e.g., after) a termination of the conference, such as in response to determining that the conference has ended or that the user device has disconnected from the conference.

In an example, a traditional conference recording may additionally (e.g., concurrently or simultaneously) be obtained. The traditional conference recording can be obtained as described with respect to one of the first scenario 500 or the second scenario 550 of FIG. 5. As such, the technique 1100 can further include receiving a request to generate a recording of the conference and capturing, in the recording of the conference, respective media streams received from devices of conference participants. As such, at least one additional media stream corresponding to at least one additional conference participant may be received. The media stream can be combined with the at least one additional media stream into a combined media stream. The combined media stream can also be output, at the user device, in a user interface associated with the conference.

Figure 12:
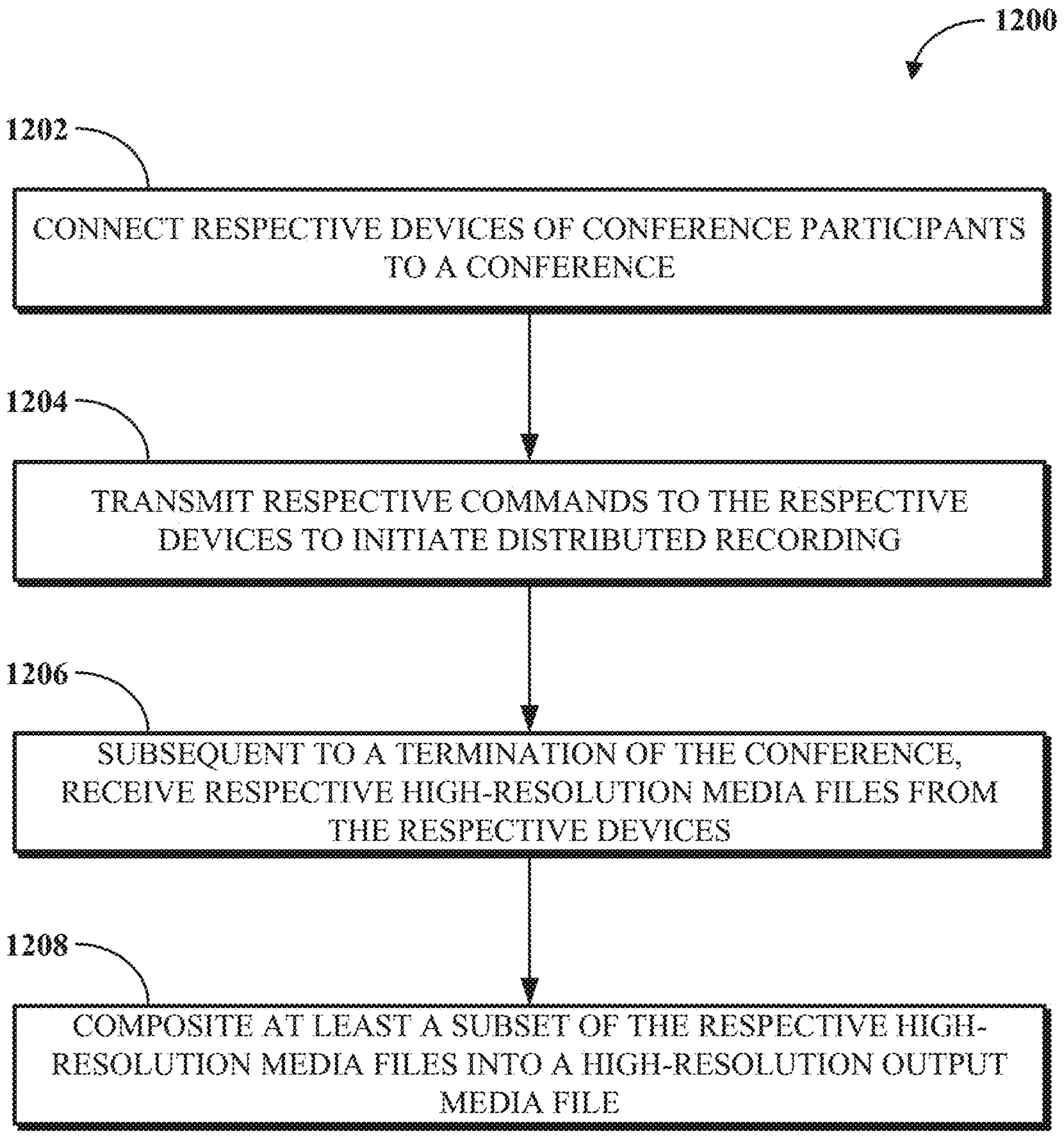
FIG. 12 is a flowchart of an example of a technique for generating composite HD conference recordings.

FIG. 12 is a flowchart of an example of a technique 1200 for generating composite HD conference recordings. The technique 1200 can be executed using computing devices, such as the systems, hardware, and software described with respect to FIGS. 1-10. The technique 1200 can be performed, at least in part, by an HD recording manager of a software platform, such as the HD recording manager 610 of FIG. 6 or the HD recording manager 750 of FIG. 7B. The technique 1200 can be performed, for example, by executing a machine-readable program or other computer-executable instructions, such as routines, instructions, programs, or other code. The steps, or operations, of the technique 1200 or another technique, method, process, or algorithm described in connection with the implementations disclosed herein can be implemented directly in hardware, firmware, software executed by hardware, circuitry, or a combination thereof.

For simplicity of explanation, the technique 1200 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1202, respective devices of conference participants are connected to a conference hosted by a conferencing server. For example, each of the devices (e.g., a conferencing application therein) may transmit a request to the conferencing server to connect the device to the conference. Other devices, in addition to the respective devices, may also be connected to conference.

At 1204, respective commands are transmitted to the respective devices to initiate distributed recording. A command to initiate distributed recording at a device directs the device (e.g., an HD recording tool therein, such as the HD recording tool 618 of FIG. 6 or the HD recording tool 700 of FIG. 7A) to obtain an HD conference recording. In an example, the respective commands may be transmitted from the conferencing server. In an example, transmitting a command to initiate distributed recording at a device can mean that the HD recording tool therein initiates the recoding based on a configuration of the conference, such as described with respect to FIG. 8. In an example, transmitting a command to initiate distributed recording at a device includes that a user of the device may cause the HD recording tool to obtain the HD conference recording.

At 1206, respective high-resolution media files are received at the conferencing server from the respective devices. The respective high-resolution media files can be received subsequent to a termination of the conference. In an example, recording of an HD conference recording may be stopped at a device before the conference terminates and the HD conference recording may be transmitted to the conferencing server before the conference terminates. For example, user interface controls (e.g., action buttons, menu items, verbal commands, or gestures) associated with the HD recording tool may enable a user at a user device to stop the recording and to cause the HD recording tool to be immediately uploaded to the conferencing server. As such, in an example, a high-resolution media file may be received from a user device of a conference participant while the conference is ongoing.

The high-resolution media files can include video data. In an example, respective audio media files and/or respective screen content media files corresponding to at least the subset of the respective high-resolution media files may also be received at the conferencing server subsequent to the termination of the conference.

At 1208, at least a subset of the respective high-resolution media files are composited into a high-resolution output media file. The at least the subset of the respective high-resolution media files can be composited into the high-resolution output media file based on a compositing template. In an example, the subset of the respective high-resolution media files can be selected by a user. As described with respect to FIG. 9, a search may identify high-resolution media files associated with multiple conferences. As such, in an example, a media file that is not associated with the conference can be composited into the high-resolution output media file.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method. The method includes connecting respective devices of conference participants to a conference hosted by a conferencing server; transmitting respective commands to the respective devices to initiate distributed recording; subsequent to a termination of the conference, receiving respective high-resolution media files from the respective devices; and compositing at least a subset of the respective high-resolution media files into a high-resolution output media file. Other embodiments of this aspect include corresponding computer systems, apparatus, and computer programs recorded on one or more computer storage devices, each configured to perform the actions of the methods.

Implementations may include one or more of the following features. The method may include subsequent to the termination of the conference, receiving respective audio media files corresponding to at least the subset of the respective high-resolution media files. The method may include subsequent to the termination of the conference, receiving respective screen content media files corresponding to at least the subset of the respective high-resolution media files. The at least the subset of the respective high-resolution media files can be composited into the high-resolution output media file based on a compositing template. The subset of the respective high-resolution media files can be selected by a user. The method may include receiving, during the conference, a high-resolution media file from a user device of a conference participant. Compositing the at least the subset of the respective high-resolution media files into the high-resolution output media file may include compositing, into the high-resolution output media file, a media file that is not associated with the conference. Implementations of the described techniques may include hardware, a method or process, or computer software on a computer-accessible medium.

One general aspect includes a system. The system includes one or more memories and one or more processors. The one or more processors are configured to execute instructions stored in the one or more memories to connect respective devices of conference participants to a conference hosted by a conferencing server; transmit respective commands to the respective devices to initiate distributed recording; subsequent to a termination of the conference, receive respective high-resolution media files from the respective devices; and composite at least a subset of the respective high-resolution media files into a high-resolution output media file. Other embodiments of this aspect include corresponding computer systems, apparatus, and computer programs recorded on one or more computer storage devices, each configured to perform the actions of the methods.

Implementations may include one or more of the following features. The system where the one or more processors can be configured to execute instructions stored in the one or more memories to receive respective audio media files corresponding to at least the subset of the respective high-resolution media files. The one or more processors can be configured to execute instructions stored in the one or more memories to receive respective screen content media files corresponding to at least the subset of the respective high-resolution media files. The at least the subset of the respective high-resolution media files can be composited into the high-resolution output media file. The one or more processors can be configured to execute instructions stored in the one or more memories to receive, from a user, a selection of the subset of the respective high-resolution media files. The one or more processors can be configured to execute instructions stored in the one or more memories to receive a high-resolution media file from a user device of a conference participant. The instructions to composite the at least the subset of the respective high-resolution media files into the high-resolution output media file may include instructions to composite, into the high-resolution output media file, a media file that is not associated with the conference. Implementations of the described techniques may include hardware, a method or process, or computer software on a computer-accessible medium.

One general aspect includes a non-transitory computer readable medium storing instructions operable to cause one or more processors to perform operations. The operations include connecting respective devices of conference participants to a conference hosted by a conferencing server; transmitting respective commands to the respective devices to initiate distributed recording; subsequent to a termination of the conference, receiving respective high-resolution media files from the respective devices; and compositing at least a subset of the respective high-resolution media files into a high-resolution output media file. Other embodiments of this aspect include corresponding computer systems, apparatus, and computer programs recorded on one or more computer storage devices, each configured to perform the actions of the methods.

Implementations may include one or more of the following features. The non-transitory computer readable medium where the operations may include subsequent to the termination of the conference, receiving at least one audio media file corresponding to at least one of the at least the subset of the respective high-resolution media files. The operations may include subsequent to the termination of the conference, receiving at least one screen content media file corresponding to at least one of the at least the subset of the respective high-resolution media files. The at least the subset of the respective high-resolution media files can be composited into the high-resolution output media file based on a compositing template. The subset of the respective high-resolution media files can be selected by a user. The operations may include receiving, during the conference, a high-resolution media file from a user device of a conference participant. Implementations of the described techniques may include hardware, a method or process, or computer software on a computer-accessible medium.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

storing, at a user device connected to a conference hosted by a conferencing server, a media file associated with the conference and having a first quality suitable for high-definition playback;

streaming, during the conference, a media stream having a second quality that is lower than the first quality and suitable for transmission to the conferencing server during the conference; and transferring the media file from the user device to the conferencing server.

2. The method of claim 1, further comprising:

receiving a command to initiate distributed recording at the user device, wherein storing the media file is performed based on the command.

3. The method of claim 1, wherein the media file associated with the conference is stored at the user device based on an option associated with the conference.

4. The method of claim 1, wherein storing the media file comprises:

incrementally storing the media file at the user device as the conference is ongoing.

5. The method of claim 1, wherein streaming the media stream comprises:

down-sampling the media file from the first quality to the second quality prior to transmission to the conferencing server.

6. The method of claim 1, wherein transferring the media file comprises:

determining that the conference has terminated; and transferring the media file from the user device to the conferencing server in response to determining that the conference has terminated.

7. The method of claim 1, wherein the media file includes a video stream captured by an image capture device associated with the user device, the video stream having a resolution of at least 3840×2160 pixels.

8. A user device, comprising:

one or more memories; and one or more processors, the one or more processors configured to execute instructions stored in the one or more memories to:

store at the user device connected to a conference hosted by a conferencing server, a media file associated with the conference at the user device and having a first quality suitable for high-definition playback;

stream, during the conference, a media stream having a second quality that is lower than the first quality and suitable for transmission to the conferencing server during the conference; and transfer the media file from the user device to the conferencing server.

9. The user device of claim 8, wherein the media file includes a content stream comprising data displayed on a display of the user device and shared to the conference.

10. The user device of claim 8, wherein the second quality comprises a resolution of 1280×720 pixels or lower.

11. The user device of claim 8, wherein transferring the media file to the conferencing server occurs subsequent to a termination of the conference.

12. The user device of claim 8, wherein the one or more processors are further configured to execute instructions stored in the one or more memories to:

losslessly compress the media file prior to transferring the media file to the conferencing server.

13. The user device of claim 8, wherein to transfer the media file comprises to use a protocol selected from File Transfer Protocol (FTP), Hypertext Transfer Protocol (HTTP), Secure File Transfer Protocol (SFTP), Hyper Text Transfer Protocol Secure (HTTPS), and Secure Copy Protocol (SCP).

14. The user device of claim 8, wherein the one or more processors are further configured to execute instructions stored in the one or more memories to:

receive a request from the conferencing server to transfer the media file; and transfer the media file in response to the request.

15. A non-transitory computer readable medium storing instructions operable to cause one or more processors to perform operations comprising:

storing at a user device connected to a conference hosted by a conferencing server, a media file associated with the conference at the user device and having a first quality suitable for high-definition playback;

streaming, during the conference, a media stream having a second quality that is lower than the first quality and suitable for transmission to the conferencing server during the conference; and transferring the media file from the user device to the conferencing server.

16. The non-transitory computer readable medium of claim 15, wherein the operations further comprise:

determining that transferring the media file has been interrupted; and resuming the transferring of the media file when network access is reestablished.

17. The non-transitory computer readable medium of claim 15, wherein the operations further comprise:

receiving, at the user device, at least one additional media stream from another device connected to the conference; and capturing the at least one additional media stream in a traditional conference recording at the user device.

18. The non-transitory computer readable medium of claim 15, wherein the first quality comprises a resolution selected from 1920×1080 pixels, 3840×2160 pixels, and 7680×4320 pixels.

19. The non-transitory computer readable medium of claim 15, wherein the second quality of the media stream is down-sampled from the first quality to a lower resolution.

20. The non-transitory computer readable medium of claim 15, wherein the operations further comprise:

transferring the media file to the conferencing server after a termination of the conference, based on a command received from the conferencing server.

* * * * *